(12) United States Patent
Jang et al.

(10) Patent No.: US 8,941,797 B2
(45) Date of Patent: Jan. 27, 2015

(54) METHOD OF MANUFACTURING POLARIZING PLATE, METHOD OF MANUFACTURING DISPLAY APPARATUS HAVING THE SAME AND THE DISPLAY APPARATUS

(75) Inventors: Dae-Hwan Jang, Gyeonggi-do (KR); Atsushi Takakuwa, Gyeonggi-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 193 days.

(21) Appl. No.: 13/552,897

(22) Filed: Jul. 19, 2012

(65) Prior Publication Data

US 2013/0088663 A1 Apr. 11, 2013

(30) Foreign Application Priority Data

Oct. 11, 2011 (KR) ........................ 10-2011-0103691

(51) Int. Cl.
*G02F 1/1335* (2006.01)
*G02B 5/30* (2006.01)

(52) U.S. Cl.
CPC ........ *G02B 5/3058* (2013.01); *G02F 1/133528* (2013.01); *G02F 2001/133548* (2013.01)
USPC .......................................................... 349/96

(58) Field of Classification Search
USPC .......................................................... 349/96
See application file for complete search history.

(56) References Cited

U.S. PATENT DOCUMENTS

| | | | |
|---|---|---|---|
| 2008/0055509 A1* | 3/2008 | Cheng et al. | 349/48 |
| 2009/0005203 A1 | 1/2009 | Nowakowski et al. | |
| 2010/0290143 A1 | 11/2010 | Kim et al. | |
| 2011/0084424 A1* | 4/2011 | Kaida et al. | 264/293 |
| 2013/0040052 A1* | 2/2013 | Akita et al. | 427/163.1 |

FOREIGN PATENT DOCUMENTS

JP 2007148344 6/2007

\* cited by examiner

*Primary Examiner* — Timothy L Rude
(74) *Attorney, Agent, or Firm* — F. Chau & Associates, LLC (57) ABSTRACT

A method of manufacturing a polarizing plate includes disposing a non-conductive material on a base substrate, pressing the non-conductive material using a mold and forming a resist pattern, the resist pattern including a plurality of protruding portions, and forming a metal layer on the protruding portions of the resist pattern. Accordingly, a luminance of a display apparatus can be improved and a manufacturing process can be simplified.

18 Claims, 5 Drawing Sheets

METHOD OF MANUFACTURING POLARIZING PLATE, METHOD OF MANUFACTURING DISPLAY APPARATUS HAVING THE SAME AND THE DISPLAY APPARATUS

CROSS-REFERENCE TO RELATED APPLICATION

This application claims priority to Korean Patent Application No. 10-2011-103691 filed on Oct. 11, 2011, the contents of which are incorporated by reference herein in their entireties.

TECHNICAL FIELD

Exemplary embodiments of the present invention relate to a method of manufacturing a polarizing plate, a method of manufacturing a display apparatus having the polarizing plate, and a display apparatus. More particularly, exemplary embodiments of the present invention relate to a method of manufacturing a polarizing plate, which can improve a luminance of a display apparatus and simplify a manufacturing process, and a method of manufacturing a display apparatus having the polarizing plate, and a display apparatus.

DISCUSSION OF THE RELATED ART

Generally, liquid crystal display apparatuses have a thin thickness, a light weight, and low power consumption and are used for monitors, laptop computers, cellular phones, televisions and so on. A liquid crystal display apparatus includes a liquid crystal display panel displaying various images by adjusting a light transmittance of liquid crystal and a backlight assembly under the liquid crystal display panel to provide light to the liquid crystal display panel.

A polarizing plate is disposed between the backlight assembly and a liquid crystal layer and polarizes light coming from the backlight assembly.

A conventional polarizing plate is manufactured by adsorbing iodine on a polyvinyl alcohol film and extending the polyvinyl alcohol film in a direction. The conventional polarizing plate has low thermal resistance. The conventional polarizing plate may absorb about half of light emitted from the backlight assembly, so light use efficiency is decreased, thus decreasing a luminance of the liquid crystal display apparatus.

To address the decrease in efficiency, wire grid polarizing plates having a metal pattern including a plurality of metal portions extending in a direction and disposed apart from each other at uniform gaps from each other have been used. Wire grid polarizing plates, due to including metal, may have high thermal resistance. Wire grid polarizing plates reflect light having a direction different from a direction of a polarizing axis to the backlight assembly so that light use efficiency may increase and a luminance of the liquid crystal display apparatus may be improved.

However, wire grid polarizing plates including the metal pattern in which each metal portion has a small width and a small gap are difficult to manufacture. A shape of the metal pattern is difficult to control in an etching process and a manufacturing cost increases.

SUMMARY OF THE INVENTION

Exemplary embodiments of the present invention provide a method of manufacturing a polarizing plate that can improve a luminance of a display apparatus and simplify a manufacturing process, a method of manufacturing a display apparatus including the polarizing plate, and a display apparatus manufactured by the method of manufacturing a display apparatus.

According to an exemplary embodiment, there is provided a method of manufacturing a polarizing plate that includes disposing a non-conductive material on a base substrate, pressing the non-conductive material using a mold and forming a resist pattern, the resist pattern including a plurality of protruding portions, and forming a metal layer on the protruding portions of the resist pattern.

In an exemplary embodiment, the forming the metal layer may include coating a metal ink on a blanket, transferring the metal ink coated on the blanket on the protruding portions of the resist pattern and curing the metal ink transferred on the protruding portions of the resist pattern.

In an exemplary embodiment, the metal ink may have a plurality of particles including at least one of aluminum (Al), gold (Au), silver (Ag), copper (Cu), chrome (Cr), iron (Fe) or nickel (Ni).

In an exemplary embodiment, upper surfaces of the protruding portions of the resist pattern have a concave shape.

According to an exemplary embodiment, there is provided a method of manufacturing a display apparatus. The method includes forming a first display substrate including a pixel electrode, forming a first polarizing plate on the first display substrate, forming a second display substrate including a common electrode on the first polarizing plate, forming a liquid crystal layer between the second display substrate and the first polarizing plate and forming a backlight assembly providing light to the first display substrate. Forming the first polarizing plate includes disposing a non-conductive material on a base substrate, pressing the non-conductive material using a mold to form a resist pattern, the resist pattern including a plurality of protruding portions, and forming a metal layer on the protruding portions of the resist pattern.

In an exemplary embodiment, forming the metal layer includes coating a metal ink on a blanket, transferring the metal ink coated on the blanket on the protruding portions of the resist pattern and curing the metal ink transferred on the protruding portions of the resist pattern.

In an exemplary embodiment, the metal ink has a plurality of particles including at least one of aluminum (Al), gold (Au), silver (Ag), copper (Cu), chrome (Cr), iron (Fe) or nickel (Ni).

In an exemplary embodiment, upper surfaces of the protruding portion of the resist pattern have a concave shape.

In an exemplary embodiment, the method further includes forming a second polarizing plate between the liquid crystal layer and the second display substrate.

In an exemplary embodiment, the method further includes forming a second polarizing plate on the second display substrate.

In an exemplary embodiment, wherein the first display substrate further includes a gate pattern having a plurality of gate lines and a plurality of gate electrodes. The gate pattern is formed by disposing a non-conductive material on a first substrate, pressing the non-conductive material using a gate pattern mold to form a gate resist pattern, the gate resist pattern including a plurality of protruding portions, and forming a gate metal layer on the protruding portions of the gate resist pattern.

In an exemplary embodiment, the second display substrate further includes a plurality of color filters and a light blocking pattern between the color filters. The light blocking pattern is formed by disposing a non-conductive material on a second substrate, pressing the non-conductive material using a light blocking pattern mold and forming a light blocking resist pattern, the light blocking resist pattern including a plurality of protruding portions, and forming a light blocking layer on the protruding portions of the light blocking resist pattern.

According to an exemplary embodiment, there is provided a display apparatus that includes a first display substrate, a first polarizing plate, a liquid crystal layer, a second display substrate and a backlight assembly. The first display substrate includes a pixel electrode. The first polarizing plate is disposed on the first display substrate. The first polarizing plate includes a base substrate, a resist pattern and a metal layer. The resist pattern is disposed on the base substrate. The resist pattern includes a non-conductive material. The resist pattern has a plurality of protruding portions. The metal layer is disposed on the protruding portions of the resist pattern. The second display substrate is disposed on the liquid crystal layer. The second display substrate includes a common electrode. The backlight assembly provides light to the first display substrate.

In an exemplary embodiment, the metal layer may include at least one of aluminum (Al), gold (Au), silver (Ag), copper (Cu), chrome (Cr), iron (Fe) or nickel (Ni).

In an exemplary embodiment, upper surfaces of the protruding portions of the resist pattern have a concave shape.

In an exemplary embodiment, the display apparatus further includes a second polarizing plate between the liquid crystal layer and the second display substrate.

In an exemplary embodiment, the display apparatus further includes a second polarizing plate on the second display substrate.

In an exemplary embodiment, the first display substrate further includes a gate pattern having a plurality of gate lines and a plurality of gate electrodes. The gate pattern includes a first substrate, a gate resist pattern and a gate metal layer. The gate resist pattern is disposed on the first substrate. The gate resist pattern includes a non-conductive material. The gate resist pattern has a plurality of protruding portions. The gate metal layer is disposed on the protruding portions of the gate resist pattern.

In an exemplary embodiment, the second display substrate further includes a plurality of color filters and a light blocking pattern between the color filters. The light blocking pattern includes a second substrate, a light blocking resist pattern and a light blocking layer. The light blocking resist pattern is disposed on the second substrate. The light blocking resist pattern includes a non-conductive material. The light blocking resist pattern has a plurality of protruding portions. The light blocking layer is disposed on the protruding portions of the light blocking resist pattern.

In an exemplary embodiment, the backlight assembly includes a reflecting plate reflecting light blocked by the first polarizing plate toward the first display substrate.

According to the embodiments of the present invention, the polarizing plate includes a metal layer so that light having a direction different from a direction of a polarizing axis can be reflected to the backlight assembly and reused. As a consequence, a luminance of the display apparatus can be improved.

A metal ink is transferred on the protruding portions of the resist pattern to form the metal layer so that an etching process can be omitted. As a consequence, a manufacturing process can be simplified, characteristics of the polarizing plate can be improved, and a manufacturing cost can be decreased.

BRIEF DESCRIPTION OF THE DRAWINGS

The embodiments of the present invention will become more apparent with reference to the accompanying drawings, in which.

DETAILED DESCRIPTION

Hereinafter, the embodiments of the present invention will be described in detail with reference to the accompanying drawings.

Figure 1:
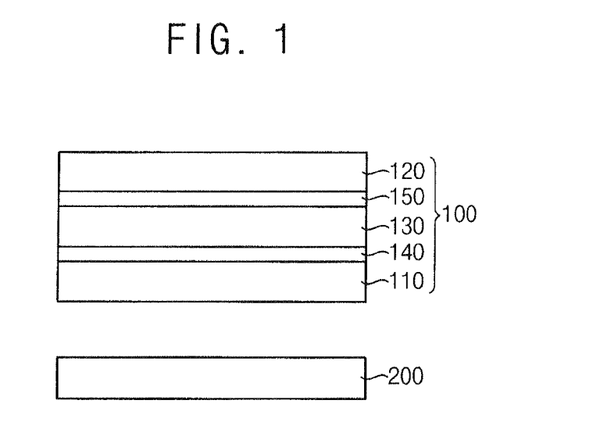
FIG. 1 is a cross-sectional view illustrating a display apparatus according to an exemplary embodiment of the present invention.

FIG. 1 is a cross-sectional view illustrating a display apparatus according to an exemplary embodiment of the present invention.

Referring to FIG. 1, the display apparatus includes a display panel 100 and a backlight assembly 200.

The display panel 100 includes a first display substrate 110, a second display substrate 120, a liquid crystal layer 130, a first polarizing plate 140 and a second polarizing plate 150.

The first display substrate 110 includes pixel electrodes. The first display substrate 110 further includes a plurality of gate lines extending in a first direction, a plurality of data lines extending in a second direction crossing the first direction and a plurality of switching elements connected to the gate lines and the data lines.

The second display substrate 120 faces the first display substrate 110. The second display substrate 120 includes a common electrode. The second display substrate 120 further includes a plurality of color filters and a light blocking pattern disposed between the color filters.

The liquid crystal layer 130 is disposed between the first and second display substrates 110 and 120. The liquid crystal layer 130 includes a plurality of liquid crystal molecules. A light transmittance of the liquid crystal layer 130 is adjusted by electric fields between the pixel electrodes of the first display substrate 110 and the common electrode of the second display substrate 120.

The first polarizing plate 140 is disposed between the first display substrate 110 and the liquid crystal layer 130. The first polarizing plate 140 polarizes light provided from the backlight assembly 200. The first polarizing plate 140 has a first polarizing axis. The first polarizing plate 140 passes light beams having a direction of the first polarizing axis among light beams having various directions, which are provided from the backlight assembly 200.

A shape of the first polarizing plate 140 and a method of manufacturing the first polarizing plate 140 are described in detail referring to FIGS. 2 and 3A to 3E.

The second polarizing plate 150 is disposed between the liquid crystal layer 130 and the second display substrate 120. The second polarizing plate 150 polarizes light passing through the liquid crystal layer 130. The second polarizing plate 150 has a second polarizing axis. The second polarizing axis is substantially perpendicular to the first polarizing axis. The second polarizing plate 150 passes light beams having a direction of the second polarizing axis among light beams having various directions, which pass through the liquid crystal layer 130.

The display panel 100 further includes a gate driver and a data driver.

The gate driver and the data driver are connected to the first display substrate 110 and output driving signals to the first display substrate 110. The gate and data drivers each include a flexible printed circuit ("FPC"), a driving chip mounted on the FPC and a printed circuit board ("PCB") connected to the FPC.

The backlight assembly 200 provides light to the display panel 100. The backlight assembly 200 is disposed under the first display panel 110.

The backlight assembly 200 includes a plurality of light sources generating light. For example, according to an embodiment, the backlight assembly 200 includes at least one of a cold cathode fluorescent lamp ("CCFL"), an external electrode fluorescent lamp ("EEFL"), a flat fluorescent lamp ("FFL"), and a light emitting diode ("LED").

According to an embodiment, the backlight assembly 200 is a direct type backlight assembly having light sources disposed corresponding to an entire area of the display panel 100. According to an embodiment, the backlight assembly 200 is an edge type backlight assembly having light sources disposed at an edge portion of the display panel 100. When the backlight assembly 200 is the edge type backlight assembly, the backlight assembly further includes a light guide plate guiding light from the light sources toward the display panel 100.

The backlight assembly 200 further includes a reflecting plate reflecting light, which does not pass the first polarizing plate 140, toward the first display substrate 110. The reflecting plate is disposed under the light sources.

Figure 2:
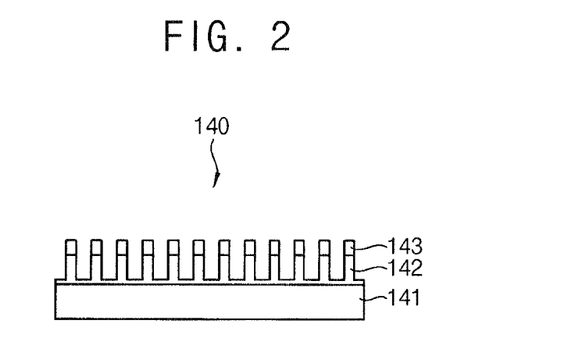
FIG. 2 is a cross-sectional view illustrating the first polarizing plate of FIG. 1.

FIG. 2 is a cross-sectional view illustrating the first polarizing plate 140 of FIG. 1.

Referring to FIG. 2, the first polarizing plate 140 includes a base substrate 141, a resist pattern 142 and a metal layer 143.

The base substrate 141 includes a transparent material. For example, according to an embodiment, the base substrate 141 includes glass.

The resist pattern 142 is disposed on the base substrate 141. The resist pattern 142 includes a non-conductive material. The resist pattern 142 includes a resin. The non-conductive material is disposed on the base substrate 141 and is pressed using a mold, so that the resist pattern 142 is formed.

The resist pattern 142 includes a plurality of protruding portions. The protruding portions of the resist pattern 142 have a rectangular shape in a cross sectional view.

The protruding portions of the resist pattern 142 form a stripe pattern in a plan view. An extending direction of the protruding portions defines the first axis of the first polarizing plate 140.

A width of each protruding portion of the resist pattern 142 is equal to or less than about 60 nm. For example, according to an embodiment, the width of the protruding portion of the resist pattern 142 is about 50 nm. An interval between two adjacent protruding portions is equal to or less than about 60 nm. For example, according to an embodiment, an interval between the two adjacent protruding portions is about 50 nm.

The metal layer 143 is disposed on the protruding portions of the resist pattern 142. A metal is transferred on upper end portions of the protruding portions of the resist pattern 142 and the metal layer 143 is formed.

For example, according to an embodiment, the metal layer 143 includes at least one of aluminum (Al), gold (Au), silver (Ag), copper (Cu), chrome (Cr), iron (Fe) or nickel (Ni). The metal layer 143 is formed using a metal ink. The metal ink has particles including at least one of aluminum (Al), gold (Au), silver (Ag), copper (Cu), chrome (Cr), iron (Fe) or nickel (Ni).

The metal layer 143 has a metal pattern having metal portions corresponding to the protruding portions of the resist pattern 142. For example, the metal layer 143 has a stripe pattern in a plan view. An extending direction of the metal pattern defines the first axis.

A width of each metal pattern is equal to or less than about 60 nm. For example, according to an embodiment, a width of the metal pattern 142 is about 50 nm. An interval between two adjacent metal portions is equal to or less than about 60 nm. For example, according to an embodiment, an interval between the two adjacent metal portions is about 50 nm.

The first polarizing plate 140 passes light beams having a direction of the first polarizing axis, which are provided from the backlight assembly 200. The first polarizing plate 140 reflects light beams having a direction different from the direction of the first polarizing axis among light beams provided from the backlight assembly 200. The reflected light beams are reflected by the reflecting plate of the backlight assembly 200 back to the first polarizing plate 140 so that a light use efficiency can be improved.

FIGS. 3A to 3E are cross-sectional views illustrating processes of manufacturing the first polarizing plate 140 of FIG. 1.

Figure 3A:
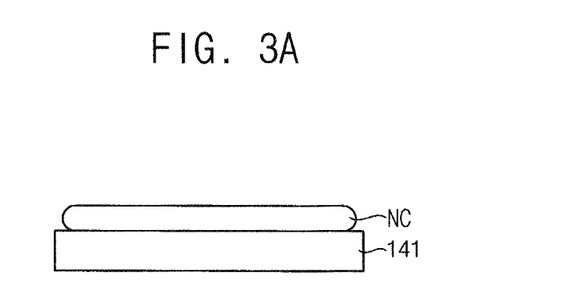
FIGS. 3A to 3E are cross-sectional views illustrating processes of manufacturing the first polarizing plate of FIG. 1.

Referring to FIG. 3A, a non-conductive material NC is disposed on a base substrate 141. The non-conductive material NC includes a resin.

Figure 3B:
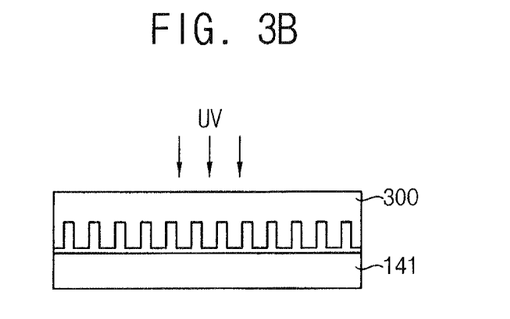

Referring to FIG. 3B, the non-conductive material NC is pressed using a mold 300 to form a resist pattern 142.

When the non-conductive material NC is pressed using the mold 300, the non-conductive material NC is cured by ultraviolet rays. Alternatively, when the non-conductive material NC is pressed using the mold 300, the non-conductive material NC is cured by heat.

The mold 300 has a shape corresponding to a shape of the resist pattern 142. For example, the mold 300 has recessed portions corresponding to the protruded portions of the resist pattern 142.

For example, the mold 300 includes at least one of silicon, glass and nickel (Ni).

A size of the mold 300 corresponds to a size of the first polarizing plate 140. When the size of the mold 300 corresponds to the size of the first polarizing plate 140, a pressing process using the mold 300 is performed once to form the resist pattern 142 on an entire area of the first polarizing plate 140.

According to an embodiment, a size of the mold 300 is smaller than a size of the first polarizing plate 140. When the size of the mold 300 is smaller than the size of the first polarizing plate 140, a pressing process using the mold 300 is repetitively performed several times to form the resist pattern 142 on an entire area of the first polarizing plate 140.

Figure 3C:
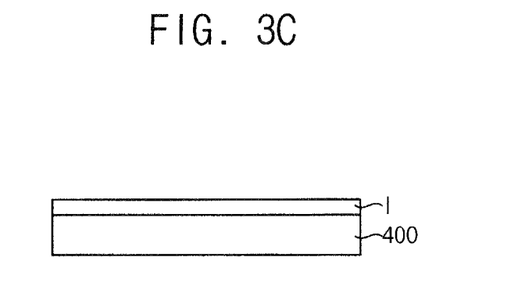

Referring to FIG. 3C, a metal ink I is coated on a blanket 400.

The metal ink I has metal particles. The metal particles may include at least one of aluminum (Al), gold (Au), silver (Ag), copper (Cu), chrome (Cr), iron (Fe) or nickel (Ni). A size (e.g., a diameter) of a metal particle is equal to or less than 20 nm.

The blanket 400 has a shape of a circular cylinder. A surface of the blanket 400 includes at least one of silicon and rubber. For example, according to an embodiment, the blanket 400 includes polydimethylsilioxane ("PDMS").

Figure 3D:
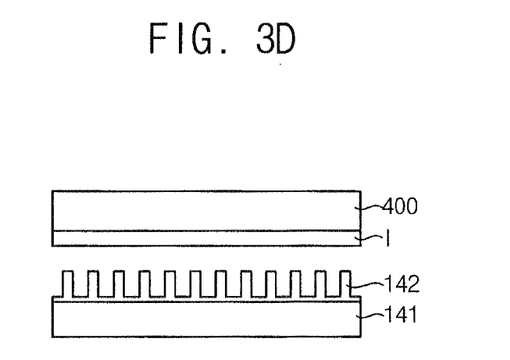

Referring to FIG. 3D, the blanket 400 on which the metal ink I is coated approaches the resist pattern 142. The metal ink I coated on the blanket 400 contacts the protruding portions of the resist pattern 142. The metal ink I coated on the blanket 400 is transferred on the protruding portions of the resist pattern 142.

Figure 3E:
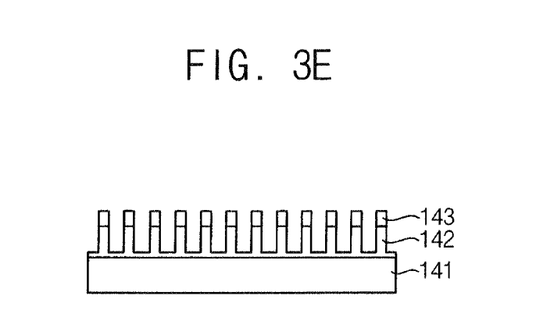

Referring to FIG. 3E, the metal ink I transferred on the protruding portions of the resist pattern 142 is cured. For example, according to an embodiment, the metal ink I is cured by heat, ultraviolet rays, or microwaves.

Figure 4:
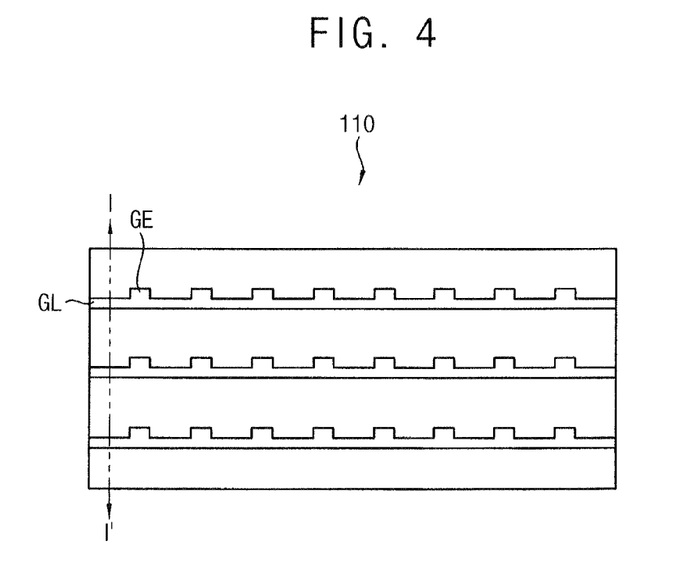
FIG. 4 is a plan view illustrating the first display substrate of FIG. 1.
Figure 5:
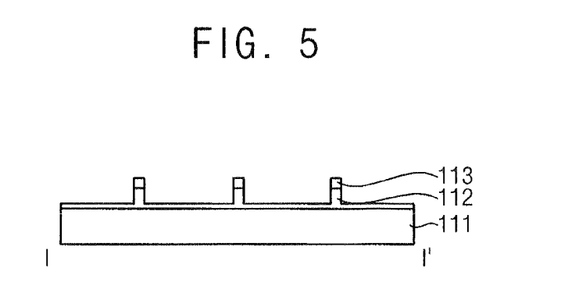
FIG. 5 is a cross-sectional view taken along a line I-I' of FIG. 4.

FIG. 4 is a plan view illustrating the first display substrate 110 of FIG. 1. FIG. 5 is a cross-sectional view taken along a line I-I' of FIG. 4.

According to an embodiment, the method of manufacturing the first polarizing plate 140 is applicable to forming a gate pattern of the first display substrate 110. For convenience of description, the first display substrate 110 includes a gate pattern as shown in FIGS. 4 and 5. For convenience of description, the gate pattern included in the first display substrate 110 includes three gate lines as shown in FIGS. 4 and 5.

Referring to FIGS. 4 and 5, the first display substrate 110 includes a plurality of gate lines.

The gate pattern includes gate lines GL extending in the first direction and gate electrodes GE protruded from the gate line GL in the second direction crossing the first direction.

The gate pattern includes a first substrate 111, a gate resist pattern 112 and a gate metal layer 113.

The first substrate 111 includes a transparent material. For example, the first substrate 111 includes glass.

The gate resist pattern 112 is disposed on the first substrate 111. The gate resist pattern 112 includes a non-conductive material, such as a resin. The non-conductive material is disposed on the first substrate 111 and is pressed using a mold so that the gate resist pattern 112 is formed.

The gate resist pattern 112 includes a plurality of protruding portions. The protruding portions of the gate resist pattern 112 have a rectangular shape in a cross sectional view.

The gate metal layer 113 is disposed on the protruding portions of the gate resist pattern 112. A metal is transferred on upper end portions of the protruding portions of the gate resist pattern 112 and the gate metal layer 113 is formed.

For example, the gate metal layer 113 includes at least one of aluminum (Al), gold (Au), silver (Ag), copper (Cu), chrome (Cr), iron (Fe) or nickel (Ni). The gate metal layer 113 is formed using a metal ink. The metal ink has particles including at least one of aluminum (Al), gold (Au), silver (Ag), copper (Cu), chrome (Cr), iron (Fe) or nickel (Ni).

The gate metal layer 113 has metal portions corresponding to the protruding portions of the gate resist pattern 112.

Figure 6:
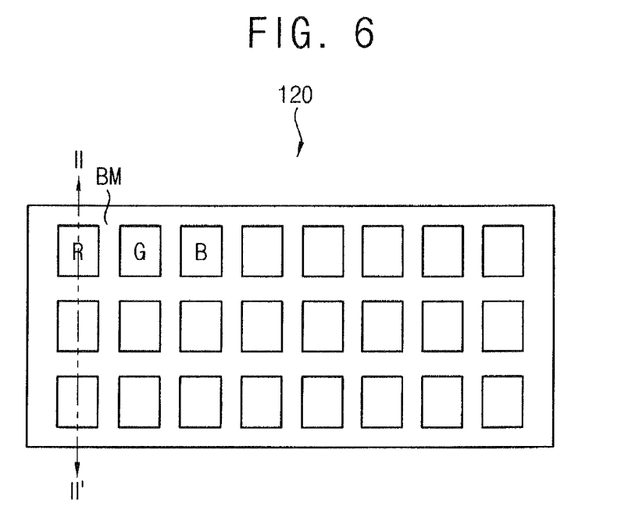
FIG. 6 is a plan view illustrating the second display substrate of FIG. 1.
Figure 7:
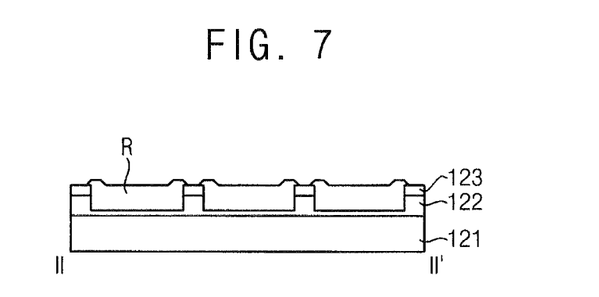
FIG. 7 is a cross-sectional view taken along a line II-II' of FIG. 6.

FIG. 6 is a plan view illustrating the second display substrate 120 of FIG. 1. FIG. 7 is a cross-sectional view taken along a line II-II' of FIG. 6.

The method of manufacturing the first polarizing plate 140 is applicable to forming a light blocking pattern of the second display substrate 120. For convenience of description, the second display substrate 120 includes a light blocking pattern and color filters as shown in FIGS. 6 and 7. For convenience of description, the second display substrate 120 includes three color filters and a light blocking pattern corresponding to the color filters as shown in FIGS. 6 and 7.

Referring to FIGS. 6 and 7, the second display substrate 120 includes a plurality of color filters R, G and B and a light blocking pattern disposed between the color filters R, G and B.

The light blocking pattern includes a second substrate 121, a light blocking resist pattern 122 and a light blocking layer 123.

The second substrate 121 includes a transparent material. For example, the second substrate 121 includes glass.

The light blocking resist pattern 122 is disposed on the second substrate 121. The light blocking resist pattern 122 includes a non-conductive material. The light blocking resist pattern 122 includes a resin. The non-conductive material is disposed on the second substrate 121 and pressed using a mold so that the light blocking resist pattern 122 is formed.

The light blocking resist pattern 122 includes a plurality of protruding portions. The protruding portions of the light blocking resist pattern 122 have a rectangular shape in a cross sectional view.

The light blocking layer 123 is disposed on the protruding portions of the light blocking resist pattern 122. A metal is transferred on upper end portions of the protruding portions of the light blocking resist pattern 122 and the light blocking layer 123 is formed.

For example, the light blocking layer 123 includes a metal or an organic material. For example, the light blocking layer 123 includes at least one of carbon black, graphite, titanium oxide, iron oxide, chrome (Cr), silver (Ag), and tin (Sn).

The light blocking layer 123 has portions corresponding to the protruding portions of the light blocking resist pattern 122.

According to an exemplary embodiment, the first polarizing plate 140 includes the metal layer 143 so that light having a direction different from a direction of the first polarizing axis is reflected to the backlight assembly 200 and reused. As a consequence, a luminance of the display apparatus can be improved.

The metal ink I is transferred on the protruding portions of the resist pattern 142 to form the metal layer 143 so that an etching process may be omitted. As a consequence, a manufacturing process can be simplified, characteristics of the first polarizing plate 140 can be improved, and a manufacturing cost can be decreased.

Figure 8:
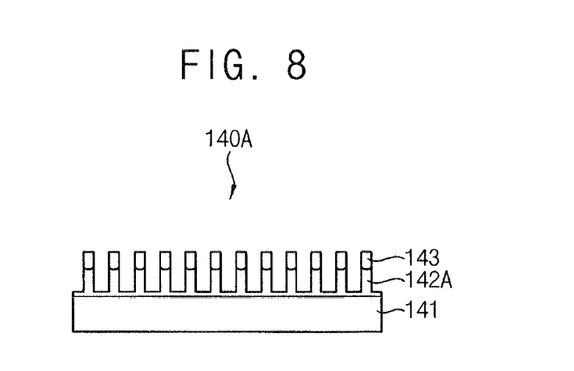
FIG. 8 is a cross-sectional view illustrating a first polarizing plate according to an exemplary embodiment of the present invention.

FIG. 8 is a cross-sectional view illustrating a first polarizing plate according to an exemplary embodiment of the present invention.

A method of manufacturing a polarizing plate, a method of manufacturing a display apparatus, and a display apparatus according to the present exemplary embodiment are the same or substantially the same as the method of manufacturing a polarizing plate, the method of manufacturing a display apparatus, and a display apparatus described in connection with FIGS. 1 to 7 except for a shape of a first polarizing plate 140A. The same reference numerals may be used to refer to the same or substantially the same parts as those described in connection with FIGS. 1 to 7.

Referring to FIG. 8, the first polarizing plate 140A includes a base substrate 141, a resist pattern 142A and a metal layer 143.

The base substrate 141 includes a transparent material. For example, the base substrate 141 includes glass.

The resist pattern 142A is disposed on the base substrate 141. The resist pattern 142A includes a non-conductive material. The resist pattern 142A includes a resin. The non-conductive material is disposed on the base substrate 141 and the non-conductive material is pressed using a mold so that the resist pattern 142A is formed.

The resist pattern 142A includes a plurality of protruding portions. An upper surface of each protruding portion of the resist pattern 142A has a concave shape. A central portion of the upper surface of the protruding portion of the resist pattern 142A is lower than an edge portion of the upper surface of the protruding portion of the resist pattern 142A.

The mold has recessed portions corresponding to the protruded portions of the resist pattern 142A. Upper surfaces of the recessed portions of the mold have a convex shape so that upper surfaces of the protruding portions of the resist pattern 142A have a concave shape.

The metal layer 143 is disposed on the protruding portions of the resist pattern 142A. A metal is transferred on upper end portions of the protruding portions of the resist pattern 142A so that the metal layer 143 is formed.

For example, the metal layer 143 includes at least one of aluminum (Al), gold (Au), silver (Ag), copper (Cu), chrome (Cr), iron (Fe) or nickel (Ni). The metal layer 143 is formed using a metal ink. The metal ink has particles including at least one of aluminum (Al), gold (Au), silver (Ag), copper (Cu), chrome (Cr), iron (Fe) or nickel (Ni).

According to an exemplary embodiment, the upper surfaces of the protruding portions of the resist pattern 142A have a concave shape so that the metal layer 143 can be effectively formed on the protruding portions of the resist pattern 142A. As a consequence, characteristics of the first polarizing plate 140A can be improved.

Figure 9:
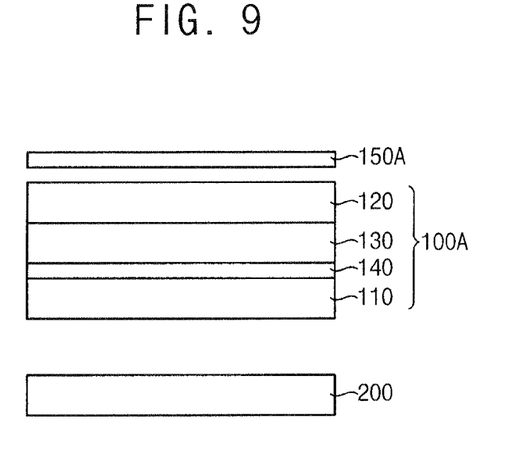
FIG. 9 is a cross-sectional view illustrating a display apparatus according to an exemplary embodiment of the present invention.

FIG. 9 is a cross-sectional view illustrating a display apparatus according to an exemplary embodiment of the present invention.

A method of manufacturing a polarizing plate, a method of manufacturing a display apparatus, and a display apparatus according to the present exemplary embodiment are the same or substantially the same as the method of manufacturing a polarizing plate, the method of manufacturing a display apparatus, and the display apparatus described in connection with FIGS. 1 to 7 except for a position of a second polarizing plate 150A. The same reference numerals may be used to refer to the same or substantially the same parts as those described in connection with FIGS. 1 to 7.

Referring to FIG. 9, the display apparatus includes a display panel 100A and a backlight assembly 200.

The display panel 100A includes a first display substrate 110, a second display substrate 120, a liquid crystal layer 130 and a first polarizing plate 140.

The first display substrate 110 includes pixel electrodes. The first display substrate 110 further includes a plurality of gate lines extending in a first direction, a plurality of data lines extending in a second direction crossing the first direction and a plurality of switching elements connected to the gate lines and the data lines.

The second display substrate 120 faces the first display substrate 110. The second display substrate 120 includes a common electrode. The second display substrate 120 further includes a plurality of color filters and a light blocking pattern disposed between the color filters.

The liquid crystal layer 130 is disposed between the first and second display substrates 110 and 120. The liquid crystal layer 130 includes a plurality of liquid crystal molecules. A light transmittance of the liquid crystal layer 130 is adjusted by electric fields between the pixel electrodes of the first display substrate 110 and the common electrode of the second display substrate 120.

The first polarizing plate 140 is disposed between the first display substrate 110 and the liquid crystal layer 130. The first polarizing plate 140 polarizes light provided from the backlight assembly 200. The first polarizing plate 140 has a first polarizing axis. The first polarizing plate 140 passes light beams having a direction of the first polarizing axis among light beams having various directions provided from the backlight assembly 200.

The second polarizing plate 150A is disposed on the second display substrate 120. The second polarizing plate 150A is formed separately from the display panel 100A.

The second polarizing plate 150A polarizes light passing through the second display substrate 120. The second polarizing plate 150A has a second polarizing axis. The second polarizing axis is substantially perpendicular to the first polarizing axis. The second polarizing plate 150A passes light beams having a direction of the second polarizing axis among light beams having various directions passing through the second display substrate 120.

The backlight assembly 200 provides light to the display panel 100A. The backlight assembly 200 is disposed under the first display panel 110.

The backlight assembly 200 includes a plurality of light sources generating light. For example, the backlight assembly 200 includes at least one of a cold cathode fluorescent lamp ("CCFL"), an external electrode fluorescent lamp ("EEFL"), a flat fluorescent lamp ("FFL"), and a light emitting diode ("LED").

The backlight assembly 200 further includes a reflecting plate reflecting light which does not pass the first polarizing plate 140 toward the first display substrate 110. The reflecting plate is disposed under the light sources.

According to the embodiments of the present invention, the polarizing plate includes the metal layer so that light having a direction different from the polarizing axis may be reflected to the backlight assembly and reused. As a consequence, a luminance of the display apparatus can be improved.

The metal ink is transferred on the protruding portions of the resist pattern to form the metal layer so that an etching process may be omitted. As a consequence, a manufacturing process can be simplified, characteristics of the polarizing plate can be improved, and a manufacturing cost can be decreased.

The foregoing is illustrative of the embodiments of the present invention and is not to be construed as limiting thereof. Although a few exemplary embodiments of the present invention have been described, those skilled in the art will readily appreciate that many modifications are possible in the exemplary embodiments. Accordingly, all such modifications are intended to be included within the scope of the embodiments of the present invention as defined in the claims.

What is claimed is:

1. A method of manufacturing a polarizing plate, the method comprising:
   disposing a non-conductive material on a base substrate;
   pressing the non-conductive material using a mold and forming a resist pattern, the resist pattern including a plurality of protruding portions;
   coating a metal ink on a blanket;
   transferring the metal ink coated on the blanket to the protruding portions of the resist pattern; and
   forming a metal layer on the protruding portions of the resist pattern including curing the metal ink transferred to the protruding portions of the resist pattern.

2. The method of claim 1, wherein the metal ink has a plurality of particles including at least one of aluminum (Al), gold (Au), silver (Ag), copper (Cu), chromium (Cr), iron (Fe) or nickel (Ni).

3. The method of claim 1, wherein upper surfaces of the protruding portions of the resist pattern have a concave shape.

4. A method of manufacturing a display apparatus, the method comprising:
forming a first display substrate including a pixel electrode;
forming a first polarizing plate on the first display substrate, wherein forming the first polarizing plate comprises:
disposing a non-conductive material on a base substrate;
pressing the non-conductive material using a mold and forming a resist pattern, the resist pattern including a plurality of protruding portions;
coating a metal ink on a blanket;
transferring the metal ink coated on the blanket to the protruding portions of the resist pattern; and
forming a metal layer on the protruding portions of the resist pattern including curing the metal ink transferred to the protruding portions of the resist pattern;
forming a second display substrate including a common electrode on the first polarizing plate;
forming a liquid crystal layer between the second display substrate and the first polarizing plate; and
forming a backlight assembly.

5. The method of claim 4, wherein the metal ink has a plurality of particles including at least one of aluminum (Al), gold (Au), silver (Ag), copper (Cu), chromium (Cr), iron (Fe) or nickel (Ni).

6. The method of claim 4, wherein upper surfaces of the protruding portions of the resist pattern have a concave shape.

7. The method of claim 4, further comprising forming a second polarizing plate between the liquid crystal layer and the second display substrate.

8. The method of claim 4, further comprising forming a second polarizing plate on the second display substrate.

9. A method of manufacturing a display apparatus, the method comprising:
forming a first display substrate including a pixel electrode;
forming a first polarizing plate on the first display substrate, wherein forming the first polarizing plate comprises:
disposing a non-conductive material on a base substrate;
pressing, the non-conductive material using a mold and forming a resist pattern, the resist pattern including a plurality of protruding portions,
wherein the first display substrate includes a gate pattern having a plurality of gate lines and a plurality of gate electrodes, and
wherein the gate pattern is formed by:
disposing a non-conductive material on a first substrate;
pressing the non-conductive material using a gate pattern mold and forming a gate resist pattern, the gate resist pattern including a plurality of protruding portions; and
forming a gate metal layer on the protruding portions of the gate resist pattern;
forming a second display substrate including a common electrode on the first polarizing plate;
forming a liquid crystal layer between the second display substrate and the first polarizing plate; and
forming a backlight assembly.

10. A method of manufacturing a display apparatus, the method comprising:
forming a first display substrate including a pixel electrode;
forming a first polarizing plate on the first display substrate, wherein forming the first polarizing plate comprises:
disposing a non-conductive material on a base substrate;
pressing the non-conductive material using a mold and forming a resist pattern, the resist pattern including a plurality of protruding portions;
forming a second display substrate including a common electrode on the first polarizing plate;
forming a liquid crystal layer between the second display substrate and the first polarizing plate; and
forming a backlight assembly,
wherein the second display substrate further includes a plurality of color filters and a light blocking pattern between the color filters, and
wherein the light blocking pattern is formed by:
disposing a non-conductive material on a second substrate;
pressing the non-conductive material using a light blocking pattern mold and forming a light blocking resist pattern, the light blocking resist pattern including a plurality of protruding portions; and
forming a light blocking layer on the protruding portions of the light blocking resist pattern.

11. A display apparatus comprising:
a first display substrate including a pixel electrode, the first gate substrate comprising:
a first gate substrate;
a gate resist pattern on the first substrate, the gate resist pattern including a non-conductive material and having a plurality of protruding portions; and
a gate metal layer on the protruding portions of the gate resist pattern;
a first polarizing plate on the first display substrate;
a liquid crystal layer on the first polarizing plate;
a second display substrate on the liquid crystal layer, the second display substrate including a common electrode; and
a backlight assembly.

12. The display apparatus of claim 11, wherein the metal layer includes at least one of aluminum (Al), gold (Au), silver (Ag), copper (Cu), chromium (Cr), iron (Fe) or nickel (Ni).

13. The display apparatus of claim 11, wherein upper surfaces of the protruding portions of the resist pattern have a concave shape.

14. The display apparatus of claim 11, further comprising a second polarizing plate between the liquid crystal layer and the second display substrate.

15. The display apparatus of claim 11, further comprising a second polarizing plate on the second display substrate.

16. The display apparatus of claim 11, wherein the backlight assembly comprises a reflecting plate.

17. A display apparatus comprising:
a first display substrate including a pixel electrode;
a first polarizing plate on the first display substrate, the first polarizing plate comprising:
a base substrate;
a resist pattern on the base substrate, the resist pattern including a non-conductive material and having a plurality of protruding portions; and
a metal layer on the protruding portions of the resist pattern;
a liquid crystal layer on the first polarizing plate;
a second display substrate on the liquid crystal layer, the second display substrate including a common electrode; and
a backlight assembly,
wherein the second display substrate includes a plurality of color filters and a light blocking pattern between the color filters, and wherein the light blocking pattern comprises:
  a second substrate;
  a light blocking resist pattern on the second substrate, the light blocking resist pattern including a non-conductive material and having a plurality of protruding portions; and
  a light blocking layer on the protruding portions of the light blocking resist pattern.

18. A display apparatus comprising:
a polarizing plate comprising:
  a base substrate;
  a resist pattern on the base substrate, wherein the resist pattern includes having a plurality of protrusions spaced apart from each other by a predetermined distance; and
  a metal layer on the protruding portions of the resist pattern, wherein the metal layer includes metal portions that respectively correspond to the protruding portions; and
a display substrate comprising:
  a first gate substrate;
  a gate resist pattern on the first substrate, the gate resist pattern including a non-conductive material and having a plurality of protruding portions; and
  a gate metal layer on the protruding portions of the gate resist pattern.

* * * * *